United States Patent [19]

Perlman

[11] 4,406,483
[45] Sep. 27, 1983

[54] UNIVERSAL CONNECTOR

[76] Inventor: Perry M. Perlman, 106 Palen Rd., Hopewell Junction, N.Y. 12533

[21] Appl. No.: 370,053

[22] Filed: Apr. 20, 1982

Related U.S. Application Data

[63] Continuation-in-part of Ser. No. 182,762, Aug. 29, 1980, abandoned.

[51] Int. Cl.³ .......................... F16L 5/00; F16L 19/08
[52] U.S. Cl. .................................. 285/161; 285/340; 285/348; 285/354
[58] Field of Search ............... 285/248, 340, 354, 161, 285/348

[56] References Cited

U.S. PATENT DOCUMENTS

| | | | |
|---|---|---|---|
| 2,147,353 | 2/1939 | Scholtes | 285/248 X |
| 2,201,372 | 5/1940 | Miller | 285/105 |
| 2,264,480 | 12/1941 | Owen | 285/340 X |
| 2,444,380 | 6/1948 | Shimek | 285/340 |
| 2,986,409 | 5/1961 | Weber | 285/161 |
| 2,999,701 | 9/1961 | Blair et al. | 285/354 X |
| 3,058,762 | 10/1962 | Howe | 285/340 |
| 3,219,751 | 11/1965 | Pfendler et al. | 285/340 X |
| 3,271,053 | 9/1966 | Kurachi | 285/248 X |
| 3,485,517 | 12/1969 | Howe | 285/348 X |
| 3,898,163 | 8/1975 | Mott | 285/340 X |

FOREIGN PATENT DOCUMENTS

| | | | |
|---|---|---|---|
| 81029 | 6/1963 | France | 285/340 |
| 1335121 | 7/1963 | France | 285/340 |
| 1556413 | 2/1969 | France | 285/340 |

*Primary Examiner*—Thomas F. Callaghan
*Attorney, Agent, or Firm*—Mandeville and Schweitzer

[57] ABSTRACT

A universal connector is provided to secure an elongated member such as a cable, hose or pipe from relative movement of the member while allowing the member to pass completely through the universal connector. In accordance with the invention, a gripping element, having at least a pair of opposed star locking washers, is interposed between the interior surfaces of the connector and the member and surrounds the outside surface of the member to clamp the member in place upon compression of the star locking washers. The connector includes means to provide a compressive force on the gripping element to compress the star locking washers including a force transmitting ring arranged to bear upon one face of the gripping element as the ring is urged into the connector by the rotation of a knurled nut threadedly received on the connector.

12 Claims, 5 Drawing Figures

UNIVERSAL CONNECTOR

RELATED APPLICATION

The present application is a continuation-in-part of Application Ser. No. 182,762, filed Aug. 29, 1980 and now abandoned.

BACKGROUND AND SUMMARY OF THE INVENTION

This invention generally relates to a universal connector adapted to securely hold and prevent relative movement of an elongated member such as a cable, hose or pipe passing through the connector. More specifically, the present invention is directed to a means for securing an elongated member such as an electrical cable, hose, pipe or any other cable-like or hose-like element against axial displacement of the member. The invention generally comprises a hollow body through which the cable-like element may be passed and a novel compressible clamping element for securing the cable-like element within the hollow body to prevent relative movement between the body and cable-like element.

In accordance with a significant feature of the invention, the compressible clamping element comprises at least one pair of opposed, contacting star washers which are inserted into the hollow body and surround the cable-like element to be secured. The star washers initially are arranged within the body whereby the teeth of the star washers contact one another and define an interior diameter for the contacting washers which is somewhat larger than the outer diameter of the cable-like element to be secured. Accordingly, the element may be conveniently passed through the star washers as it is inserted through the body of the connector. Means are provided to exert a compressive force on the star washers to force the star washers together thereby bending the teeth inwardly to grip and secure the cable-like element.

The star washers are mounted within a right cylindrical member. The use of a right cylindrical configuration for the member enables multiples of the gripping elements to be stacked or ganged in end-to-end relationship within the hollow body. The stacked arrangement of the star washers provides a superior gripping action on the elongated member to be secured.

The universal connector of the present invention is ideally suited to act as a clamping mechanism for any cable-like element such as an electrical cable, pipe or hose. Moreover, the connector may be arranged to form a termination, union or connector for a cable-like or hose-like element or elements.

In the preferred embodiment, the above-described inventive concept is incorporated into an electrical cable connector or clamp used to clamp and secure in place an electrical cable which passes through the wall of the electrical junction box. The electrical connector or clamp of the present invention eliminates the possibility that a remote pull or jerking action on the electrical cable will dislodge the end of the cable located within the electrical junction box from the terminals of the electrical junction box.

Conduit connectors, electrical cable, pipe or hose, clamps and pressure fittings for tube joints capable of securing them in place, are old in the art. For example, Canadian Pat. No. 470,006 relates to a tube connector for providing a fluid-tight connection for tubing. The device shown therein shows a pipe fitting, surrounded by a nut having internal threads which mesh with external threads of the pipe fitting. A compressible washer, surrounding an anchorage ring, when placed under compressive forces created by threading the nut about the pipe fitting, clamps the pipe or tube passing through the device. The compressible rubber mass, subjected to compressive pressure, clamps the anchorage ring tightly around the outer surface of the tube such that the lip of a split ring washer will dig into the surface of the tube and hold it in place.

The electrical cable connector embodying the present invention, as will be more fully described hereinafter, comprises a receiver element which provides a socket or seating surface for a gripping element. The gripping element has a pair of opposed star locking washers and may have more than one. The star locking washers are positioned such that their annular flanges are spaced from one another, the teeth of the star locking washers touching one another. In the preferred form of the present invention, the star locking washers are embedded in a washer made from rubber or other deformable material. Serving to compress the gripping element against the floor of the receiving socket is a force transmitting ring, which bears upon either the annular flange of one of the star locking washers or, alternatively, in the preferred embodiment, against the flat face of the washer. The force transmitting ring serves to translate the torque force, generated by threading a nut onto the receiver element, into a compressive force acting upon the gripping element.

Thus, the gripping element is firmly seated in a receiving socket and compressed between the floor of the receiving socket and a force transmitting ring. This provides an efficient connector which firmly secures and maintains in relative position an elongated member or electrical cable passing through the device. As mentioned, the force transmitting ring bears upon the gripping element. It is pushed toward the floor of the receiving socket, compressing the gripping element therebetween, by the action of the knurled nut which is screwed upon the receiver element. The force transmitting ring is pushed toward and against the gripping element by an abutment surface which is located within the interior of the kurled nut. In this manner, the torque applied to the knurled nut is translated into a compressive force acting on the force transmitting ring which serves to compress the gripping element between it and the floor of the cavity. Thus, the teeth of the star locking washers will bear against and securely hold the outside surface of the electrical cable or other member passing through the device.

In the preferred embodiment, as mentioned, the star locking washers are embedded in a deformable washer. Compression of the washer, by the same mechanism, serves to not only force the teeth of the star locking washer against the outside surface of the cable but, also, in addition, deforms the washer by compressing it so that it, too, grips around the member sought to be secured and seals the inner cavity of the body and also of the surface of the secured member. This provides a fluid tight efficient clamp.

For a more complete understanding of the above and other features and advantages of the invention, reference should be made to the following detailed description of a preferred embodiment and to the accompanying drawings.

DETAILED DESCRIPTION OF THE PREFERRED EMBODIMENT

Figure 1:
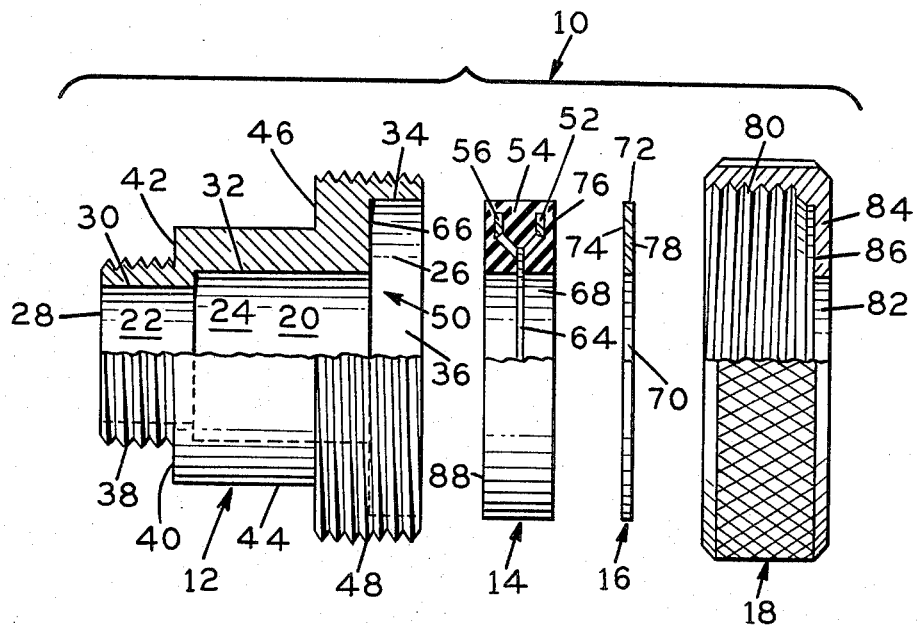
FIG. 1 is an exploded, cross sectional view of an electrical universal connector of the present invention.
Figure 3:
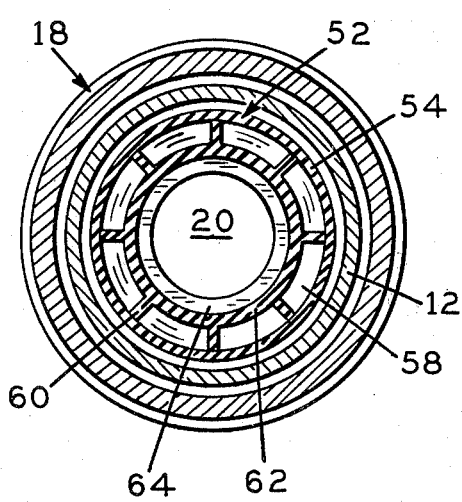
FIG. 3 is a cross sectional view, taken along lines 3—3 of FIG. 2.
Figure 2:
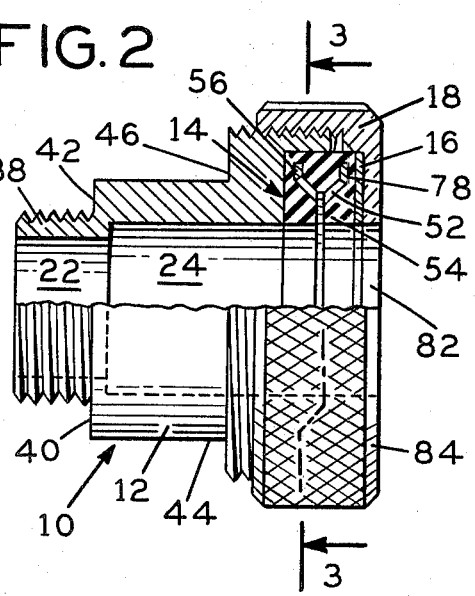
FIG. 2 is a cross sectional view of the assembled electrical cable clamp.
Figure 4A:
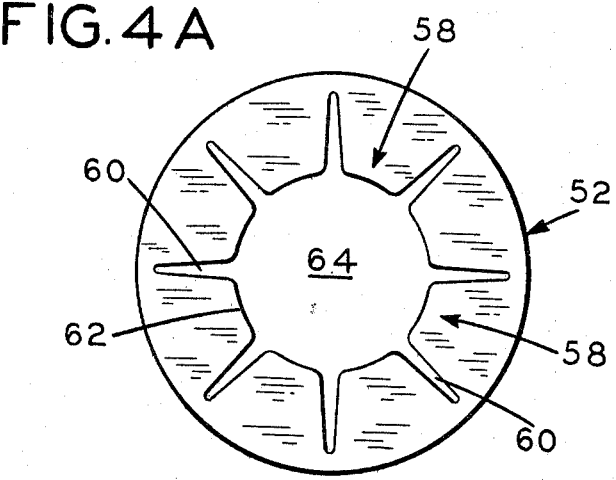
FIG. 4A is a top plan view of the star washer gripping element.
Figure 4B:
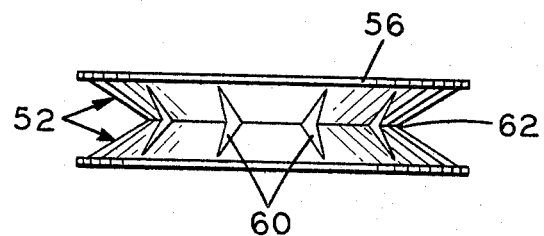
FIG. 4B is a side view of the star washer gripping element.

As best seen in the drawings, an electrical cable clamp, generally indicated as 10, is comprised of a receiver element 12, a gripping element 14, a force transmitting ring 16 and a knurled nut 18. The preferred embodiment is primarily intended to be used in the positive securing of electrical cables. The clamp of the present invention, however, can also be used for securing cylindrical pipes or hose. In use, in the preferred embodiment, receiver element 12 is secured through a wall (not shown) of an electrical junction box and is intended, in conjunction with the other elements of the present invention, to positively and firmly secure an electrical wire-carrying member passing through the electrical cable clamp 10 and into the electrical junction box.

Receiver element 12 is generally cylindrical and has a central bore 20 passing completely therethrough. Central bore 20 is divided into three cylindrical bore sections 22, 24 and 26 which have progressively increasing diameters. Cylindrical bore section 22 terminates in rear opening 28 and is defined by cylindrical wall 30. Cylindrical bore section 24 is defined by cylindrical wall 32 and cylindrical bore section 26 is defined by cylindrical wall 34. Cylindrical bore section 26 terminates in front opening 36. It should be clearly understood that cylindrical bore section 22 is in fluid communication with cylindrical bore section 24 while cylindrical bore section 24 is in fluid communication with cylindrical bore section 26.

Cylindrical bore section 22 is provided with exterior screw threads 38. The exterior screw threads 38 terminate at annular flat surface 40 which surrounds the exterior screw threads 38. Thus, a shoulder 42 is defined which, when the exterior screw threads 38 of electrical clamp 10 pass through the wall of an electrical junction box, provide a stop surface for positioning the connector on the electrical junction box. A nut (not shown) having internal screw threads which matingly engage exterior screw threads 38 is tightened onto exterior screw threads 38, on the inside of the electrical junction box, to firmly secure the receiver element 12 in place with the shoulder 42 of the receiver element 12 abutting against the side wall of the electrical junction box.

Cylindrical outside wall 44 surrounds cylindrical bore section 24 and is adjacent to annular flat surface 40. Cylindrical outside wall 44 terminates at annular flat surface 46. Exterior screw threads 48 surround cylindrical bore section 26 and a portion of cylindrical bore section 24. Cylindrical wall 34 and floor 66 of cylindrical bore section 26 define receiving socket 50 which is adapted to provide a well-defined seating area for gripping element 14.

Gripping element 14 comprises a pair of opposed star locking washers 52. Star locking washers 52 may be made from spring steel or any other tension-like suitable, bendable material such as plastic and can be selected to have any desired thickness. In the preferred embodiment, gripping element 14 is constructed so that the star locking washers 52 are molded into a compressible substance, as for example, neophrene or rubber in the form of a deformable washer 54. Pursuant to the invention, the washer 54 is of a right cylindrical configuration whereby several washers 54 each including star locking washers 52 may be stacked or ganged in an end-to-end relationship within the receiving socket 50 to enhance the gripping action of the connector. Of course, any other suitable material may be utilized to encase the locking washers 52. Each star locking washer 52 has an annular flange 56 extending around the circumference of the star locking washer 52, and a plurality of radially inwardly-directed teeth 58, separated from one another by spaces 60. The inside edge of teeth 58 define an annular lip 62 surrounding central bore 64. The opposed star locking washers 48 are embedded in the deformable washer 54 in such a manner that the annular flanges 56 are spaced from one another by the deformable material, yet the annular lip 62 of the star locking washers abut one another.

Washer 54 is of a thickness and diameter which enables it to be received and maintained within the receiving socket 50 of receiver element 12. In an alternate form of the present invention, the star locking washers 52 are merely placed, with their annular lips 62 abutting one another, into the receiving socket 50, such that the annular flange 56 of one of the star locking washers 52 is maintained flush against the floor 66 of receiving socket 50. In this latter embodiment, washer 54 is eliminated. The central bores 64 of the star locking washers 52 are in alignment with the larger bore 68 of the washer 54. The central bore 64 of the star locking washers 52 have diameters slightly greater than the diameter of the conduit sought to be secured. It will be appreciated that the gripping element 14, having the opposed star locking washers 52 made of tension-like material, will, if subjected to a compressive force about the annular flanges 56 causes the teeth 58 of the star locking washers 52 to close inwardly, decreasing central bore 64, to tightly grip the electrical cable or other conduit passing through the central bore 64. When the gripping element 14 is subjected to such a compressive force, the annular flanges 56 of star locking washers 52 are moved toward one another and the compressive force is transmitted to the relatively movable teeth 58 of the star locking washers 52, thereby causing the central bore 64 to decrease in diameter. In this manner, the gripping element 14 will tightly grip and secure the electrical member or, alternatively, a hose or pipe which is inserted through the central bore 64.

Force transmitting ring 16 is, in the preferred embodiment, a flat faced steel washer, with a round body section 72 having an outside diameter substantially equal to the outside diameter of the gripping element 14. In the preferred embodiment, the diameter of the force transmitting ring is substantially the same as the outside diameter of the washer 54. At a minimum, however, the flat side or end face 74 of the force transmitting ring covers the annular flange 56 of the star locking washers 52. The force transmitting ring 16 is provided with a central bore 70, which is of a diameter substantially the same as the bore 64 of star locking washers 52 when the gripping element 14 is in its uncompressed state. Additionally, force transmitting ring 16 has an outside diameter slightly less than the diameter of cylindrical bore section 26, so that the force transmitting ring 16 can be received within cylindrical bore section 26. Force transmitting ring 16 is provided with end face or flat side 74 which bears against the annular flanges 56 of star locking washers 52 or, in the preferred embodiment, against the flat face 76 of rubber washer 54. Force transmitting ring 16 is also provided with an end face or flat side 78.

Knurled nut 18 is generally cylindrical having an exterior knurled face in order to facilitate the rotation of the nut in either a clockwise or a counter-clockwise direction. Knurled nut 18 is provided with interior screw threads 80 which are adapted to matingly engage the exterior screw threads 48 of the receiver element 12. Knurled nut 18 is generally hollow and has a central aperture 82 defined in the end face 84. On the inside of knurled nut 18 is an annular flat abutment surface 86, which is adapted to receive the end face or flat side 78 of force transmitting ring 16.

In order to prepare the electrical cable clamp 10 for use, receiver element 12 is secured to the wall of an electrical junction box by passing cylindrical bore section 22, with its exterior screw threads 38 through the wall of the electrical junction box. The receiver element 12 is secured in position by threading a nut, having interior screw threads which matingly engage with the exterior screw threads 38, the nut being located inside of the electrical junction box. Shoulder 42 will abut against the outside wall of the electrical junction box. Gripping element 14 is then placed into the receiving socket 50 such that the annular flange 56 of one of the star locking washers 52 is flush against floor 66 or, if the washer 54 is used, the face 88 is placed flush against floor 66. Force transmitting ring 16 is then dropped into the cavity of the knurled nut 18 defined by the interior screw threads 80 and abutment surface 86, such that the flat side 78 of the force transmitting ring 16 is flush against the abutment surface 86 of the knurled nut 18. The knurled nut 18, with the force transmitting ring 16 contained therein, is then threaded onto the receiver element 12, already retaining gripping element 14. The knurled nut 18 is only turned a few turns to hold it in place but is not, at this point, tightened down. In this manner, the connector 10 is ready to be used.

When it is desired to firmly and securely hold an electrical cable in the clamp 10 such that the member passes from outside the electrical junction box, through the clamp 10 and into the inside of the electrical junction box, the electrical member is first passed through the central bore 20 of the clamp 10. This is accomplished by having one end of the electrical member pass through the central aperture 82 of the knurled nut 18, through the central bore 70 of the force transmitting ring 16, through the bore 68 of the deformable washer 54, if it is used, through the central bore 64 of the star locking washers 52 and through the cylindrical bore sections 26, 24 and 22 and into the interior of the electrical junction box.

With the electrical conduit in position, the knurled nut 18 already in position on receiver element 12 is tightened onto the receiver element 12. During tightening, the abutment surface 86 bears upon the end face 78 of force transmitting ring 16, which pushes end face 74 of force transmitting ring 16 against face 76 of the washer 54, if it is used, or against annular flange 56 of a star locking washer 52. The gripping element 14 is thus compressed between the force transmitting ring 16 and the floor 66 of receiving socket 50 of the receiver element 12. With the gripping element 14 subject to this compression, the annular flanges 56 of star locking washers 52 are compressed toward one another, which causes the teeth 58, radially projecting inwardly, to be bent inwardly into the electrical member. Movement of the teeth 58 is such that the diameter of the central bore 64 of the star locking washers 52 decreases. In this manner, the electrical cable is firmly and securely held in place, relatively immobile, because the teeth 58 of the star locking washer 52 are thrust into the electrical cable. As previously mentioned, compression on the gripping element 14 is accomplished by the force transmitting ring 16, torqued by knurled nut 18, which serves to compress the gripping element 14.

Gripping element 14 is compressed between floor 66 of the receiving socket 50 of receiver element 12 and force transmitting ring 16. The force transmitting ring 16 is pushed against the face 76 of the gripping element 14 by the action of abutment surface 86 of the knurled nut 18 on force transmitting ring 16. If the deformable washer 54 is used, then compressive forces acting on it will not only cause the star locking washers to grip the member but the deformable material of the washer will displace around the member substantially facilitating the gripping action of the gripping element. Of course, multiple stacked washers 54 may be used to further enhance the gripping action of the connector. Thus, the conduit is firmly secured in place either by the locking washers 52 acting along or with the aid of the washer. The washer 54 will also act as a seal to form a fluid-tight clamp around the cable. Varying the width facilitates the torque applied to the gripping element.

It should be understood that the above-described embodiment of the invention is meant to be an illustration of the invention. Those skilled in the art may make changes in the described embodiment such as to utilize the invention as a clamp, connector, union or terminal for a cable, pipe, hose or any other elongated member without departing from the teachings of the invention. Accordingly, reference should be made to the following appended claims in determining the scope of the invention.

I claim:

1. A universal connector for an elongated member comprising
   (a) a body section including a central bore defining a receiving socket of right cylindrical configuration,
   (b) at least one gripping means of generally right, cylindrical, peripheral configuration comprising at least one pair of opposed star locking washers embedded and completely enveloped in deformable resilient rubbery material, said star locking washers having annular flanges and teeth extending radially inwardly from said flanges, said star locking washers being positioned relative to one another such that the teeth of one star locking washer touch the teeth of the other star locking washer and the annular flanges are spaced apart, said enveloped teeth of said star locking washers generally defining a central bore of said gripping means having a diameter in an uncompressed state greater than the diameter of the elongated member adapted to be secured by the universal connector,
   (c) said gripping means having parallel flat end surfaces, being right cylindrical in shape and being received within the receiving socket, (d) said elongated member being received through said receiving socket and said central bore, and (e) force transmitting means including a flat abutment surface being adapted to transmit compressive forces to the flat end portions of said gripping means to thereby cause the teeth of said star locking washers and said enveloping deformable material to distort together into a gripping and sealing relation with the elongated member.

2. A connector according to claim 1, wherein (a) said body section is provided with exterior screw threads, (b) said force transmitting means is a force transmitting ring having a central bore and two flat end faces, the first of said end faces being maintained in contact with said gripping means, and (c) a knurled nut having interior screw threads which matingly engage said exterior screw threads of said body section, said knurled nut having a central aperture and an abutment surface, said abutment surface being adapted to transmit compressive forces, produced by screwing said knurled nut onto said receiver element, to said force transmitting ring which compresses said gripping means between said first end face of said force transmitting ring and said receiving socket to thereby cause said teeth of said star locking washers to grip around the elongated member.

3. A connector as claimed in claim 1, wherein said deformable material is neophrene.

4. A connector as claimed in claim 2, wherein said body section is provided with a second set of exterior screw threads for mounting said body through a wall of an electrical junction box.

5. A connector as claimed in claim 4, wherein said body section is provided with a shoulder for holding said body section flush against an electrical junction box.

6. A connector as claimed in claim 1, wherein said star locking washers are made from spring steel.

7. A connector as claimed in claim 2, wherein said receiving socket has a floor for abutting against the annular flange of one of said star locking washers.

8. A connector as claimed in claim 2, wherein said body section is provided with at least two cylindrical bore sections of progressively increasing diameter.

9. The connector as claimed in claim 1, wherein said elongated member comprises an electrical cable.

10. The connector as claimed in claim 1, wherein said elongated member comprises a hose.

11. The connector as claimed in claim 1, wherein said elongated member comprises a pipe.

12. The connector as claimed in claim 1, wherein a plurality of gripping means of generally right cylindrical peripheral configuration are received within the receiving socket.

* * * * *